United States Patent [19]
Owens

[11] Patent Number: 5,971,685
[45] Date of Patent: Oct. 26, 1999

[54] SECURING DEVICE FOR CARGO IN A UTILITY VEHICLE

[76] Inventor: Gary Owens, 1404 N. Outagamie St., Appleton, Wis. 54914

[21] Appl. No.: 08/931,005

[22] Filed: Sep. 15, 1997

[51] Int. Cl.⁶ ................................................. B60P 7/15
[52] U.S. Cl. .......................... 410/151; 410/122; 410/143; 410/155
[58] Field of Search .................... 410/143, 145, 410/151, 155, 121, 122; 248/354.1, 354.3, 354.6; 211/105.3, 105.4; 224/551, 552, 403

[56] References Cited

U.S. PATENT DOCUMENTS

| | | | |
|---|---|---|---|
| 1,891,588 | 12/1932 | Claus | 410/151 |
| 4,236,854 | 12/1980 | Rogers | 410/121 |
| 4,650,383 | 3/1987 | Hoff | 410/149 |
| 4,737,056 | 4/1988 | Hunt | 410/151 |
| 4,770,579 | 9/1988 | Aksamit | 410/121 X |
| 4,772,165 | 9/1988 | Bartkus | 410/145 X |
| 5,082,404 | 1/1992 | Stewart et al. | 410/127 |
| 5,427,487 | 6/1995 | Brosfske | 410/121 |
| 5,516,245 | 5/1996 | Cassidy | 410/101 |
| 5,769,580 | 6/1998 | Purvis | 410/151 |

FOREIGN PATENT DOCUMENTS

535426A1  4/1993  European Pat. Off. ............... 224/552

*Primary Examiner*—Stephen T. Gordon
*Attorney, Agent, or Firm*—Michael I. Kroll

[57] ABSTRACT

A securing device (10) for cargo (12) in a utility vehicle (13), such as a pickup truck (14), a trailer truck (16) and the like, of the type having a cargo carrying compartment (18) defined by a floor (20) and opposite side walls (22). The securing device (10) comprises a cross rail (24). An assembly (26) is for rigidly holding the cross rail (24) laterally between the side walls (22) of the cargo carrying compartment (18) in the utility vehicle (13). An assembly (28) on the cross rail (24) is for engaging the cargo (12) within the cargo carrying compartment (18), so as to retain the cargo (12) in a selected position upon the floor (20), to prevent longitudinal and lateral movement of the cargo (12).

11 Claims, 4 Drawing Sheets

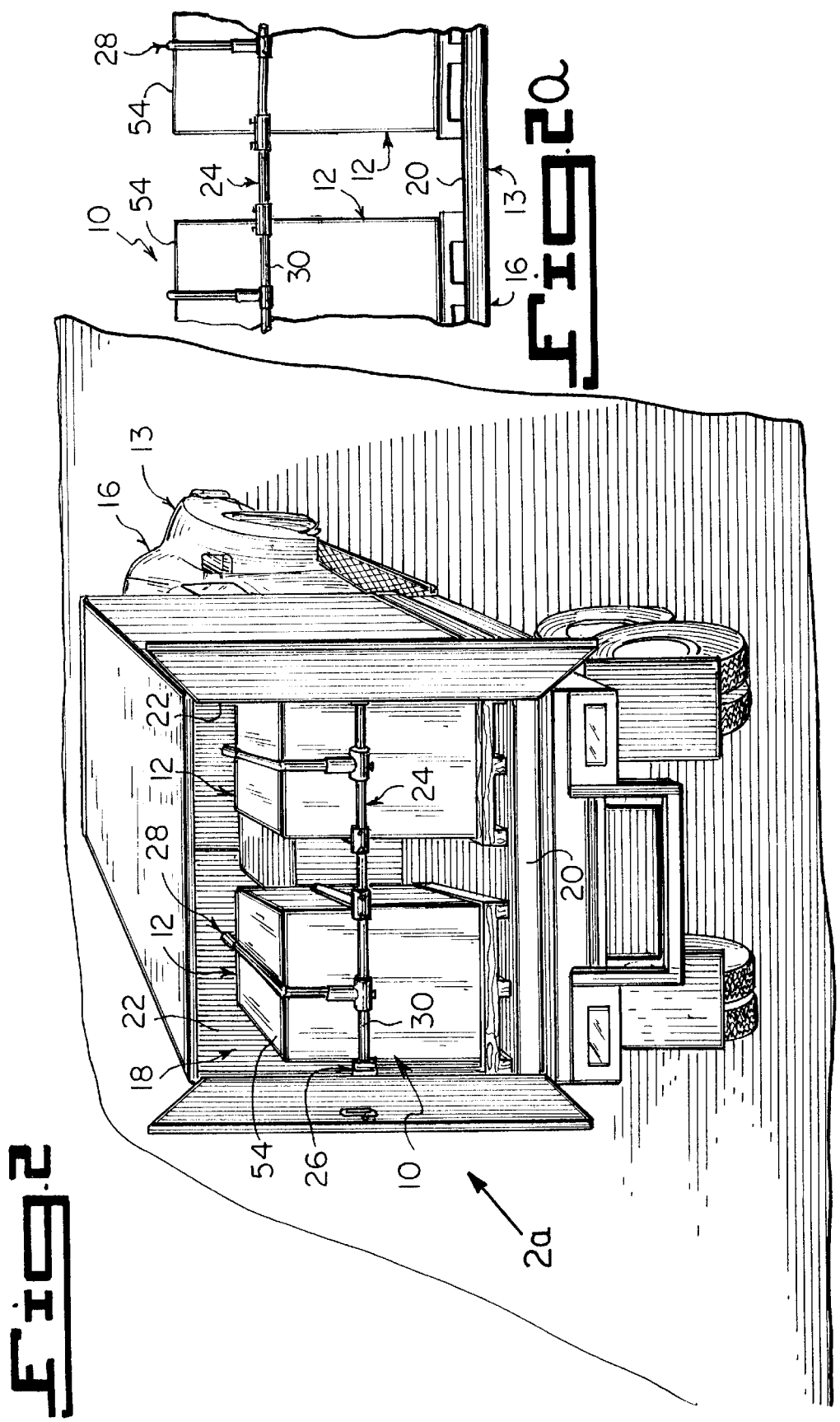

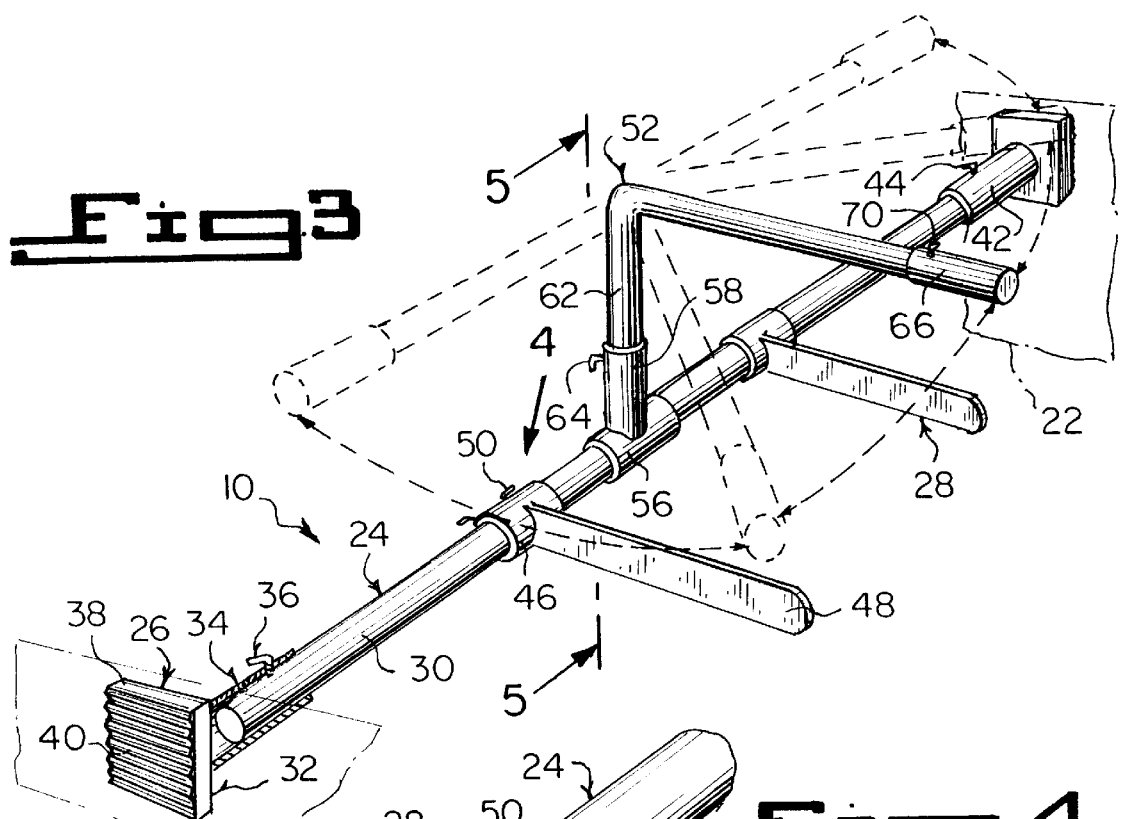
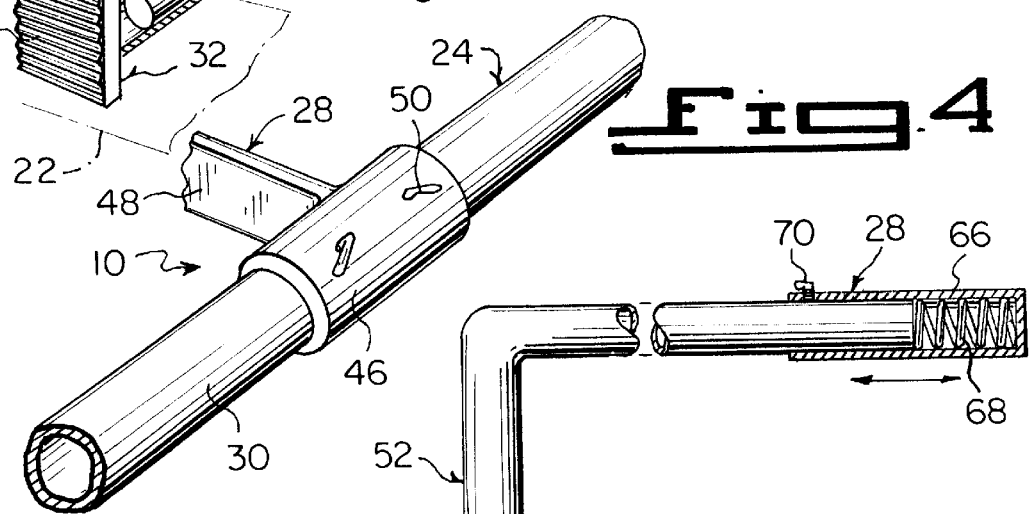
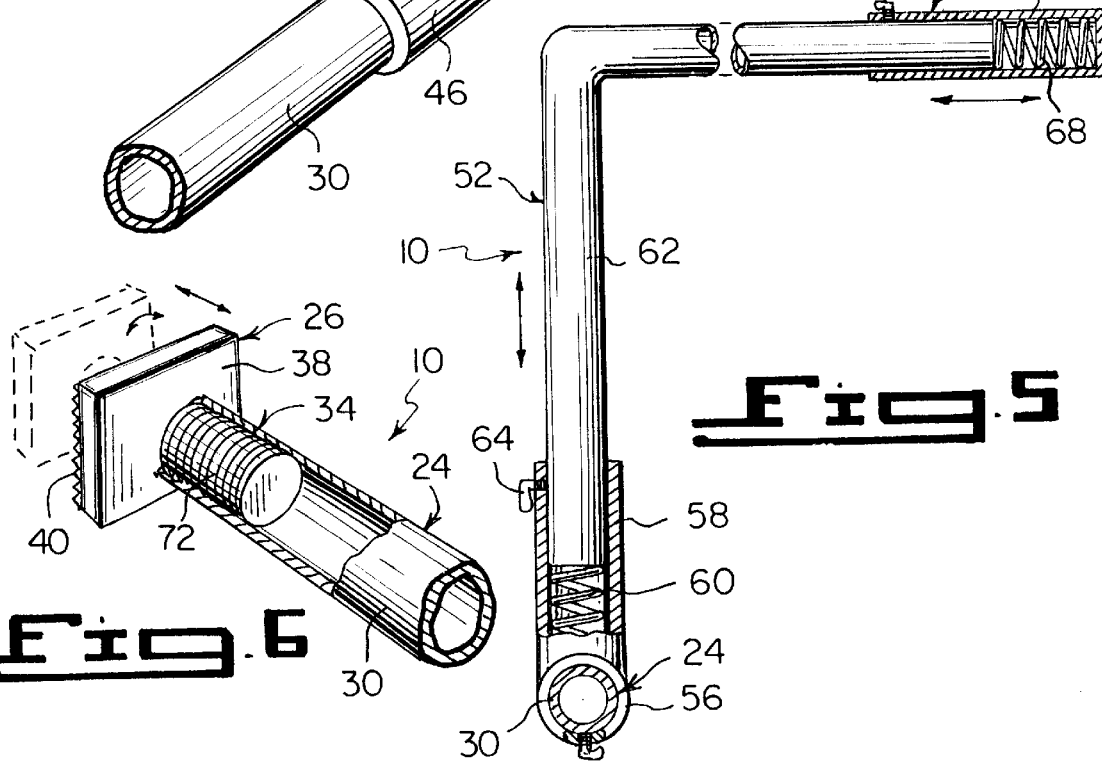
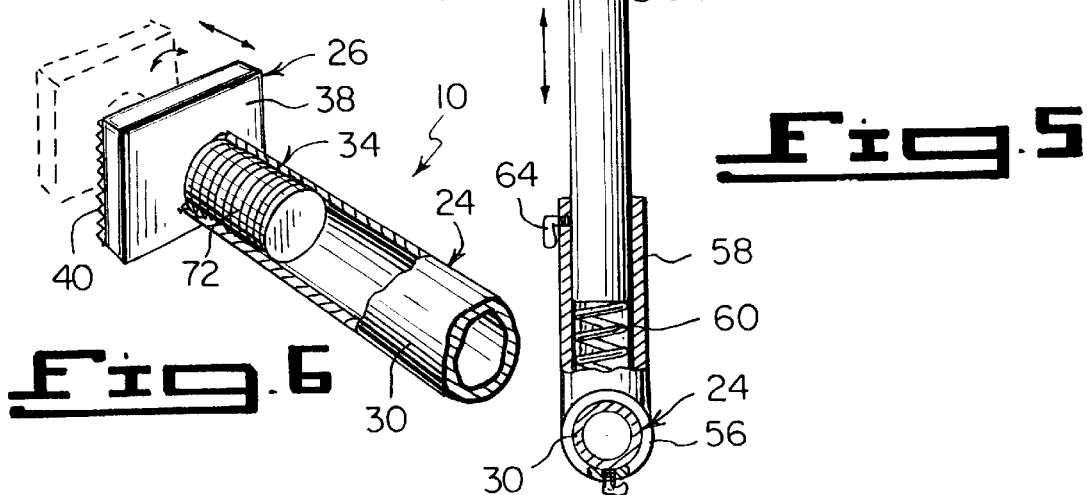

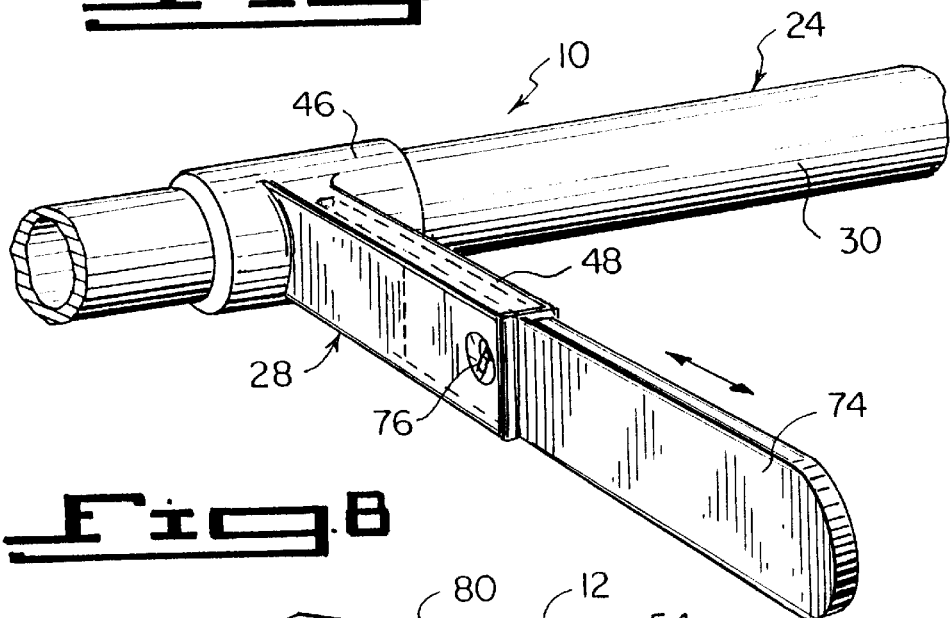
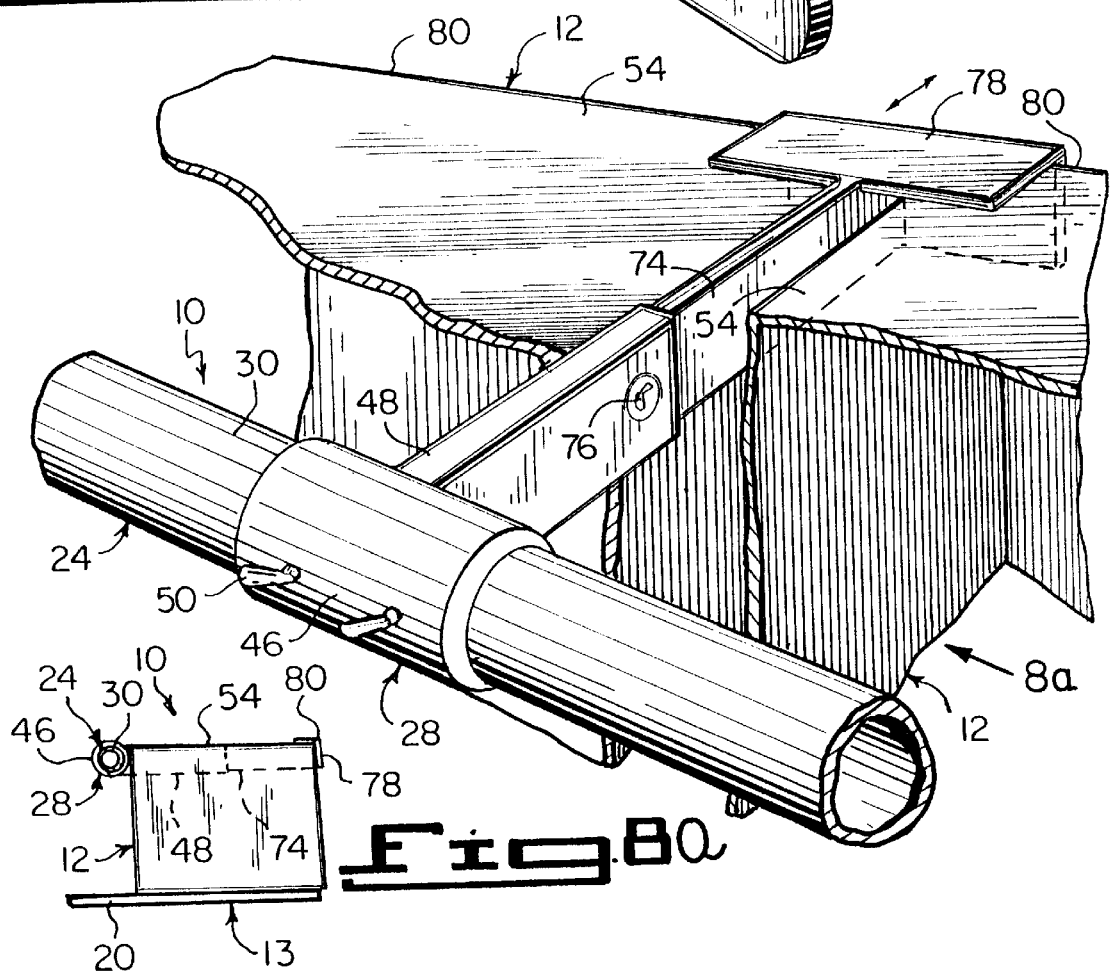

SECURING DEVICE FOR CARGO IN A UTILITY VEHICLE

BACKGROUND OF THE INVENTION

1. Field of the Invention

The instant invention relates generally to load stabilizing systems and more specifically it relates to a securing device for cargo in a utility vehicle. The securing device will prevent longitudinal and lateral movement of the cargo carried in the utility vehicle. The securing device is adjustable to accommodate and retain the cargo which is in various sizes and shapes, to be carried in different types of utility vehicles, such as pickup trucks, trailer trucks and the like.

2. Description of the Prior Art

Numerous load stabilizing systems have been provided in prior art. For example, U.S. Pat. No. 4,650,383 to Hoff; U.S. Pat. No. 5,028,185 to Shannon; U.S. Pat. No. 5,082,404 to Stewart et al. and U.S. Pat. No. 5,516,245 to Cassidy all are illustrative of such prior art. While these units may be suitable for the particular purpose to which they address, they would not be as suitable for the purposes of the present invention as heretofore described.

HOFF, PHILLIP L.

CARGO STABILIZER FOR UTILITY VEHICLES

U.S. Pat. No. 4,650,383

A cargo stabilizer is provided for utility vehicles, such as vans, pickup trucks and the like, which have a cargo carrying bed. The stabilizer prevents the cargo from shifting either fore-to-aft or laterally in the vehicle bed. The stabilizer comprises two guide rails attached lengthwise along the opposite sidewalls of the vehicle bed in a generally mutually parallel relationship. A crossbar is slidingly supported on the guide rails, and includes latches at the opposite ends of the crossbar to adjustably and positively connect the crossbar to the guide rails at a selected location. The crossbar is longitudinally adjustable between locked and unlocked positions, and includes abutment surfaces at its opposite ends which directly abut the sidewalls of the vehicle bed when the crossbar is in the locked position. Hence, substantially all laterally directed stabilizing forces that develop in retaining the cargo in its selected position are transferred directly to the sidewalls of the vehicle's bed, and do not on the guide rails themselves, thereby providing very secure stabilizing support, without requiring a heavy-duty stabilizer construction.

SHANNON, PHILLIP

LOAD SECURING SYSTEM

U.S. Pat. No. 5,028,185

A load securing system for securing loads in a trailer or van, whether the load is centered in the nose of the trailer or hold in the rear of the trailer. The load securing system includes a longitudinal member, a friction jack adjustably secured at one end, and H-bars on a plate pivotally mounted on the other end. An extension member can engage with the longitudinal member for securing a load in a center position. In an alternative embodiment, at least one friction jack can be utilized and more than one pivotally mounted H-bar plate can be utilized along the length of the longitudinal member.

STEWART, PETER V.

BUTTS, DAVID R.

VEHICLE CARGO CLAMP

U.S. Pat. No. 5,082,404

A cargo clamp for a van, the van having cargo space defined by a floor, upwardly extending sidewalls and a roof. The cargo clamp comprises a transverse track that extends between the sidewalls below the roof and is supported below the roof and is held in place by side rails on each side. A clamp is attached to the track and is movable along the side rails between the sidewalls. The clamp also includes a downwardly extending brace that engages and restrains sheet material that is positioned on edge in the cargo space. The clamp includes a handle and bolt for engagement in a threaded hole for securing the clamp to the track at a selected position.

CASSIDY, PATRICK S.

LOAD ANCHOR FOR CARGO BEAMS

U.S. Pat. No. 5,516,245

A load anchor for cargo beams used in commercial cargo trailers having E-track cargo securing slots within to which cargo straps and beams are secured. The load anchor is of a sleeve configuration movable along the length of the cargo beams. The load anchor has multiple clip engagement openings thereabout engageable by locking clips on the ends of the respective cargo straps.

SUMMARY OF THE INVENTION

A primary object of the present invention is to provide a securing device for cargo in a utility vehicle that will overcome the shortcomings of the prior art devices.

Another object is to provide a securing device for cargo in a utility vehicle that will prevent longitudinal and lateral movement of the cargo carried in the utility vehicle.

An additional object is to provide a securing device for cargo in a utility vehicle that is adjustable to accommodate and retain the cargo which can come in various sizes and shapes, so as to be carried in different types of utility vehicles, such as pickup trucks, trailer trucks and the like.

A further object is to provide a securing device for cargo in a utility vehicle that is simple and easy to use.

A still further object is to provide a securing device for cargo in a utility vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 2 is a rear perspective view of another utility vehicle, being a trailer truck, with the present invention installed within the cargo carrying compartment.

FIG. 2a is a rear elevational view taken in the direction of arrow 2a in FIG. 2, with parts broken away.

FIG. 3 is an enlarged perspective view of the present invention per se taken in the direction of arrow 3 in FIG. 1, with parts broken away and in section and parts of the side walls of the utility vehicle shown in phantom.

FIG. 4 is a further enlarged perspective view taken in the direction of arrow 4 in FIG. 3, with additional parts broken away and in section.

FIG. 5 is an enlarged cross sectional view taken along line 5—5 in FIG. 3, with parts broken away and in section, showing the adjustable top stabilizer member in greater detail.

FIG. 6 is an enlarged partial perspective view, showing an alternate adjustable foot member.

FIG. 7 is an enlarged partial perspective view, showing a first modified adjustable side bar.

FIG. 8 is an enlarged partial perspective view showing a second modified adjustable side securement bar holding two pieces of cargo in place.

FIG. 8a is a side view taken in the direction of arrow 8a in FIG. 8.

Similar reference characters denote corresponding features consistently throughout the attached drawings.

DESCRIPTION OF THE PREFERRED EMBODIMENTS

Figure 1:
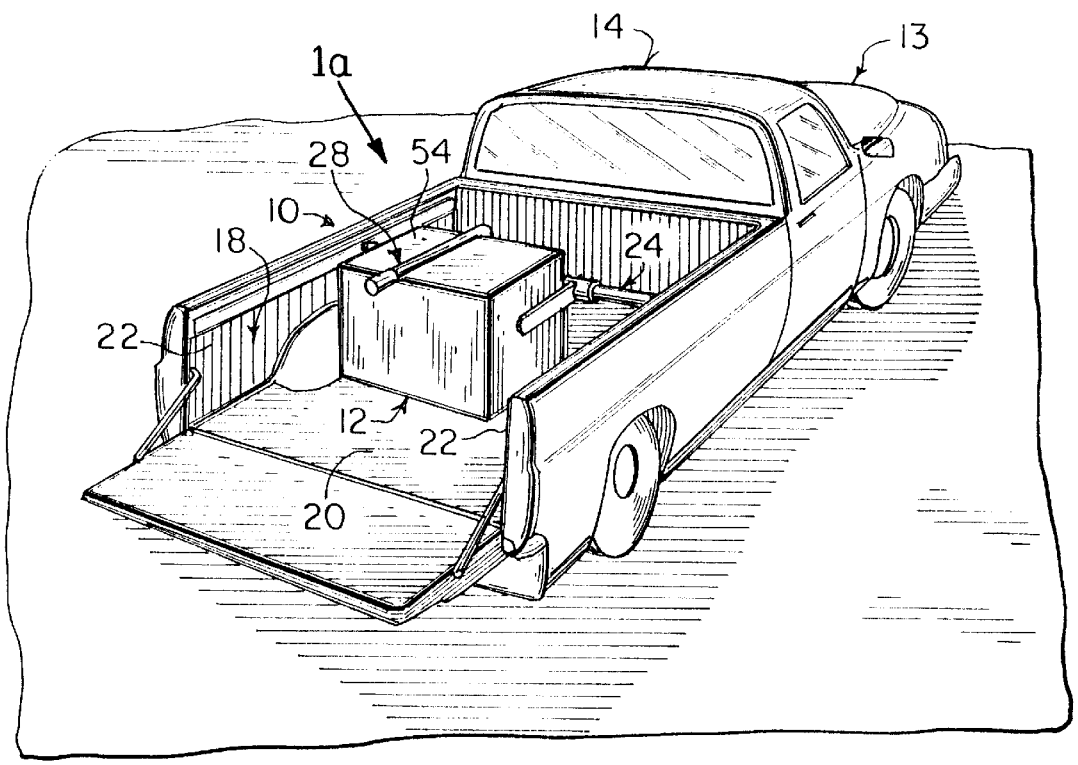
FIG. 1 is a rear perspective view of a utility vehicle, being a pickup truck, showing the present invention retaining a piece of cargo within the cargo carrying compartment.
Figure 1A:
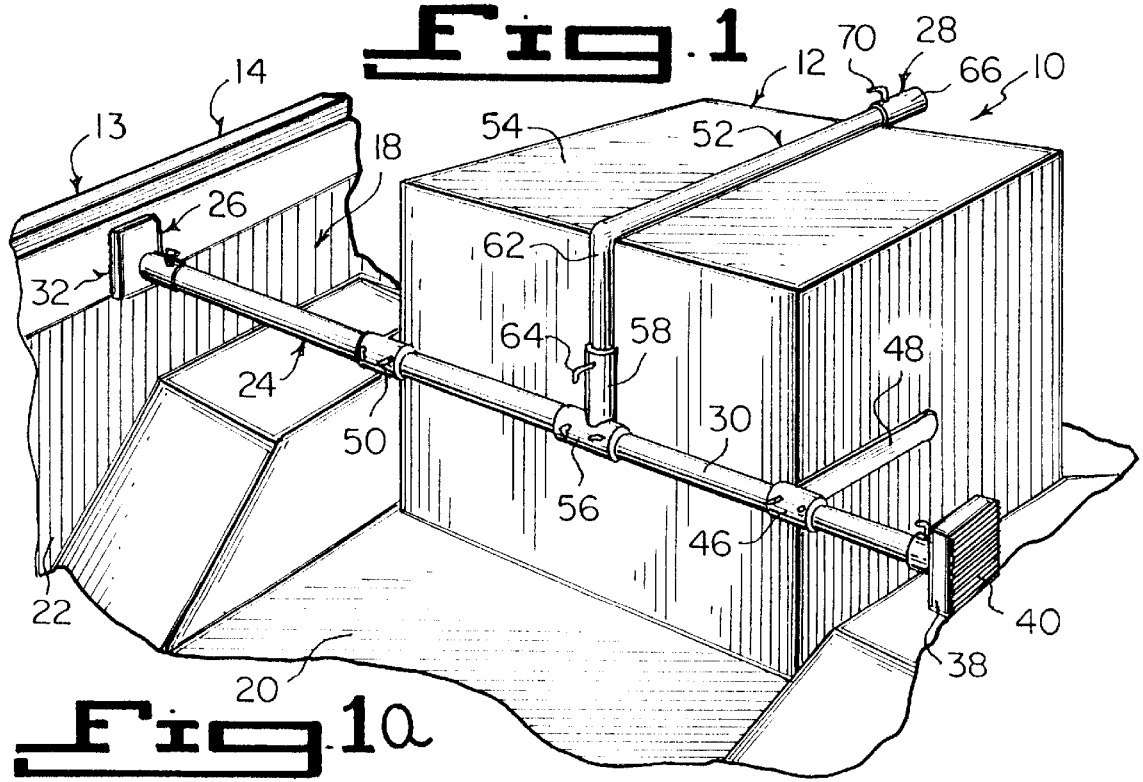
FIG. 1a is an enlarged perspective view taken in the direction of arrow 1a in FIG. 1, with parts of the utility vehicle broken away.

Turning now descriptively to the drawings, in which similar reference characters denote similar elements throughout the several views, FIGS. 1 through 8a illustrate the present invention being a securing device 10 for cargo 12 vehicle 14. With regard to the reference numerals used, the following numbering is used throughout the various drawing figures.

10 securing device
12 cargo
13 utility vehicle
14 pickup truck for 13
16 trailer truck for 13
18 cargo carrying compartment in 13
20 floor of 18
22 side wall of 18
24 cross rail of 10
26 rigidly holding assemblage of 10
28 cargo engaging assembly of 10
30 elongate cylindrically shaped tube for 24
32 foot member of 26
34 adjusting component of 26
36 locking facility of 26
38 plate of 32
40 ribbed abutment cover of 32 on 38
42 cylindrical sleeve for 34
44 setscrew with lock handle for 36
46 annular collar of 28
48 side bar of 28
50 setscrew with lock handle of 28
52 top stabilizer member of 28
54 top portion of 12
56 annular collar of 52
58 cylindrical sleeve of 52 on 56
60 first spring of 52 in 58
62 L-shaped tubular arm of 52
64 first setscrew with lock handle of 52 in 58
66 cylindrical end cap of 52
68 second spring of 52 in 66

70 second setscrew with lock handle of 52 in 66
72 externally threaded stub shaft for 34
74 longitudinally adjustable blade in 48
76 recessed winged setscrew in 48
78 V-shaped inverted corner fitting on 74
80 edge of 54

The utility vehicle 13 can be a pickup truck 14, a trailer truck 16 and the like, of the type having a cargo carrying compartment 18 defined by a floor 20 and opposite side walls 22. The securing device 10 comprises a cross rail 24. An assemblage 26 is for rigidly holding the cross rail 24 laterally between the side walls 22 of the cargo carrying compartment 18 in the utility vehicle 13. An assembly 28 on the cross rail 24 is for engaging the cargo 12 within the cargo carrying compartment 18, so as to retain the cargo 12 in a selected position upon the floor 20, to prevent longitudinal and lateral movement of the cargo 12.

The cross rail 24 is an elongate cylindrically shaped tube 30. The rigidly holding assemblage 26 includes a pair of foot members 32. Components 34 are for adjusting the foot members 32 on opposite ends of the cross rail 24. A facility 36 is for locking the foot members 32 in position on opposite ends of the cross rail 24, after the foot members 32 press against the side walls 22 of the cargo carrying compartment 18 in the utility vehicle 13.

Each foot member 32, as best seen in FIG. 3, consists of a plate 38. A ribbed abutment cover 40 is on an outer surface of the plate 38, which will prevent slippage when it presses against the side wall 22. Each adjusting component 34 is a cylindrical sleeve 42 extending centrally from an inner surface of the plate 38, which fits over and slides upon a respective end of the cross rail 24. Each locking facility 36 is a setscrew 44 having a lock handle in the cylindrical sleeve 42, so that the lock handle will manually manipulate the setscrew 44 between a locked and unlocked position.

The cargo engaging assembly 28 includes at least one annular collar 46, which slides upon the cross rail 24. At least one side bar 48 is attached at one end to the at least one annular collar 46, so as to extend generally outwardly from the cross rail 24 to engage the cargo 12. At least one setscrew 50 having a lock handle is in the at least one annular collar 46, so that the at least one lock handle will manually manipulate the at least one setscrew 50 between a locked and unlocked position.

The cargo engaging assembly 28 further includes at least one top stabilizer member 52 having a first end detachably connected with the cross rail 24 for adjustment therealong. A second end extends generally outwardly from the cross rail 24, to engage with a top portion 54 of the cargo 12.

The at least one adjustable top stabilizer member 52 consists of an annular collar 56, which slides upon the cross rail 24. A cylindrical sleeve 58 is transversely mounted to the center of the annular collar 56. A first spring 60 is carried within the cylindrical sleeve 58. An L-shaped tubular arm 62 has a first end which slides within the cylindrical sleeve and is biased by the first spring 60. A first setscrew 64 having a lock handle is in the cylindrical sleeve 58, so that the lock handle will manually manipulate the first setscrew 64 between a locked and unlocked position. A cylindrical end cap 66 is provided. A second spring 68 is carried within the cylindrical end cap 66, so that a second end of the L-shaped tubular arm 62 will be biased by the second spring 68. A second setscrew 70 having a lock handle is in the cylindrical end cap 66. The lock handle will manually manipulate the second setscrew 70 between a locked and unlocked position, whereby the cylindrical end cap 66 will prevent damage to the top portion 54 of the cargo 12.

As shown in FIG. 6, each adjusting component 34 can be an externally threaded stub shaft 72 extending centrally from an inner surface of the plate 38, which adjustably threads into the respective end of the cross rail 24. FIG. 7 shows the at least one side bar 48 containing a longitudinally adjustable blade 74 extending outwardly therefrom and a recessed winged setscrew 76, which can be manually manipulated between a locked and unlocked position.

In FIGS. 8 and 8a, the longitudinally adjustable blade 74 includes a V-shaped inverted corner fitting 78 attached transversely to a distal free end thereof. The longitudinally adjustable blade 74 can extend between two pieces of cargo 12, with the V-shaped inverted corner fitting 78 being in engagement with edges 80 of top portions 54 of the two pieces of cargo 12.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A securing device for cargo in a utility vehicle having a cargo carrying compartment defined by a floor and opposite side walls, said securing device comprising:
   a) a cross rail;
   b) means for rigidly holding said cross rail laterally between the side walls of the cargo carrying compartment in the utility vehicle; and
   c) means on said cross rail for engaging the cargo within the cargo carrying compartment, so as to retain the cargo in a selected position upon the floor to prevent longitudinal and lateral movement of cargo, said cargo engaging means including:
      i) at least one annular collar which slides upon said cross rail;
      ii) at least one side bar attached at one end to said at least one annular collar, so as to extend generally outwardly from said cross rail to engage the cargo;
      iii) at least one setscrew having a lock handle in said at least one annular collar, so tat said at least one lock handle may be used to manually manipulate said at least one setscrew between a locked and unlocked position; and
      iv) at least one top stabilizer member having a first end detachably connected with said cross rail for adjustment therealong and a second end extending generally outwardly from said cross rail to engage with a top portion of the cargo, said at least one top stabilizer member including an annular collar which slides upon said cross rail; a cylindrical sleeve transversely mounted to a center of said stabilizer member annular collar; a first spring carried within said cylindrical sleeve; an L-shaped tubular arm having a first end which slides within said cylindrical sleeve and is biased by said first spring; a first setscrew having a lock handle in said cylindrical sleeve, so that said first setscrew lock handle may be used to manually manipulate said first setscrew between a locked and unlocked position; a cylindrical end cap; a second spring carried within said cylindrical end cap, so that a second end of said L-shaped tubular arm will be biased by said second spring; and a second setscrew having a lock handle in said cylindrical end cap, so that said second setscrew lock handle may be used to manually manipulate said second setscrew between a locked and unlocked position, whereby said cylindrical end cap will prevent damage to the top portion of the cargo.

2. A securing device as recited in claim 1, wherein said cross rail is an elongate cylindrically shaped tube.

3. A securing device as recited in claim 1, wherein said rigidly holding means includes:
   a) a pair of foot members;
   b) means for adjusting said foot members on opposite ends of said cross rail; and
   c) means for locking said foot members in position on opposite ends of said cross rail, after said foot members press against the side walls of the cargo carrying compartment in the utility vehicle.

4. A securing device as recited in claim 3, wherein each said foot member includes:
   a) a plate; and
   b) a ribbed abutment cover on an outer surface of said plate which will prevent slippage when it presses against the side wall.

5. A securing device as recited in claim 4, wherein each said adjusting means includes an externally threaded stub shaft extending centrally from an inner surface of said plate which adjustably threads into said respective end of said cross rail.

6. A securing device for cargo in a utility vehicle having a cargo carrying compartment defined by a floor and opposite side walls, said securing device comprising:
   a) a cross rail;
   b) means for rigidly holding said cross rail laterally between the side walls of the cargo carrying compartment in the utility vehicle; and
   c) means on said cross rail for engaging the cargo within the cargo carrying compartment, so as to retain the cargo in a selected position upon the floor to prevent longitudinal and lateral movement of cargo, said cargo engaging means including:
      i) at least one annular collar which slides upon said cross rail;
      ii) at least one side bar attached at one end to said at least one annular collar, so as to extend generally outwardly from said cross rail to engage the cargo;
      iii) at least one setscrew having a lock handle in said at least one annular collar, so that said at least one lock handle may be used to manually manipulate said at least one setscrew between a locked and unlocked position,
   wherein said at least one side bar includes:
      a) a longitudinally adjustable blade extending outwardly therefrom; and
      b) a recessed winged setscrew which can be manually manipulated between a locked and unlocked position.

7. A securing device as recited in claim 6, wherein said longitudinally adjustable blade includes a V-shaped inverted corner fitting attached transversely to a distal free end thereof, so that said longitudinally adjustable blade can extend between two pieces of cargo with said V-shaped inverted corner fitting being in engagement with edges of top portions of the two pieces of cargo.

8. A securing device as recited in claim 6, wherein said cross rail is an elongate cylindrically shaped tube.

9. A securing device as recited in claim 8, wherein said rigidly holding means includes:
   a) a pair of foot members;
   b) means for adjusting said foot members on opposite ends of said cross rail; and
   c) means for locking said foot members in position on opposite ends of said cross rail, after said foot members press against the side walls of the cargo carrying compartment in the utility vehicle.

10. A securing device as recited in claim 9, wherein each said foot member includes:
    a) a plate; and
    b) a ribbed abutment cover on an outer surface of said plate which will prevent slippage when it presses against the side wall.

11. A securing device as recited in claim 10, wherein each said adjusting means includes an externally threaded stub shaft extending centrally from an inner surface of said plate which adjustably threads into said respective end of said cross rail.

\* \* \* \* \*